US010536512B2

(12) United States Patent
Crawford et al.

(10) Patent No.: US 10,536,512 B2
(45) Date of Patent: Jan. 14, 2020

(54) DYNAMIC GRAPH ADAPTATION FOR STREAM PROCESSING OVER HYBRID, PHYSICALLY DISPARATE ANALYTICS PLATFORMS

(71) Applicant: International Business Machines Corporation, Armonk, NY (US)

(72) Inventors: Catherine H Crawford, Carmel, NY (US); Konstantinos Katrinis, Dublin (IE); Piotr Padkowski, Lodz (PL); Andrea Reale, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 15/598,751

(22) Filed: May 18, 2017

(65) Prior Publication Data
US 2018/0337976 A1    Nov. 22, 2018

(51) Int. Cl.
*H04L 29/08* (2006.01)
*H04L 12/24* (2006.01)
*G06F 9/50* (2006.01)

(52) U.S. Cl.
CPC ........... *H04L 67/10* (2013.01); *H04L 41/12* (2013.01); *H04L 41/5025* (2013.01); *G06F 9/5066* (2013.01); *H04L 41/5009* (2013.01); *H04L 41/5054* (2013.01); *H04L 41/5096* (2013.01)

(58) Field of Classification Search
CPC ... H04L 41/12; G06F 9/5066; G06F 17/30516
See application file for complete search history.

(56) References Cited

U.S. PATENT DOCUMENTS

| | | | | |
|---|---|---|---|---|
| 9,047,133 B2* | 6/2015 | Winterfeldt | ............... | G06F 8/60 |
| 9,135,057 B2* | 9/2015 | Branson | ................... | G06F 9/48 |
| 9,984,109 B2* | 5/2018 | da Silva | ............... | G06F 16/285 |
| 10,025,827 B1* | 7/2018 | Fawcett | ............... | G06F 9/5027 |
| 2002/0087734 A1* | 7/2002 | Marshall | .................. | G06F 9/50 |
| | | | | 719/310 |
| 2005/0278694 A1* | 12/2005 | Butler | ...................... | G06F 8/61 |
| | | | | 717/107 |
| 2007/0174233 A1* | 7/2007 | Ginis | .................... | H04L 41/145 |
| 2008/0098375 A1* | 4/2008 | Isard | .................... | G06F 9/5066 |
| | | | | 717/149 |

(Continued)

OTHER PUBLICATIONS

Peter Mell et al., "The NIST Definition of Cloud Computing". Special Publication 800-145. Sep. 2011, pp. 1-7.

(Continued)

*Primary Examiner* — Lashonda T Jacobs
(74) *Attorney, Agent, or Firm* — Kurt Goudy; Otterstedt, Wallace & Kammer, LLP

(57) ABSTRACT

Dynamic graph adaptation for stream processing over hybrid, physically disparate analytics platforms, by means of a computer-implemented method that includes obtaining a streaming application graph, generating a partitioned graph by partitioning the streaming application graph in response to a topology descriptor and a partitioning algorithm, compiling the partitioned graph into a plurality of subgraphs for deployment to a plurality of respective runtimes that are described by the topology descriptor, and deploying the plurality of subgraphs to the plurality of respective runtimes.

9 Claims, 7 Drawing Sheets

(56) References Cited

U.S. PATENT DOCUMENTS

| | | | | |
|---|---|---|---|---|
| 2008/0147835 | A1* | 6/2008 | Chandra | G06F 9/5038 709/223 |
| 2011/0145790 | A1* | 6/2011 | Rajaraman | G06F 11/3668 717/124 |
| 2012/0054129 | A1* | 3/2012 | Aggarwal | G06N 20/00 706/12 |
| 2013/0166942 | A1* | 6/2013 | Branson | G06F 11/0793 714/3 |
| 2013/0239089 | A1* | 9/2013 | Eksten | G06F 8/70 717/120 |
| 2013/0239100 | A1 | 9/2013 | Andrade et al. | |
| 2013/0339357 | A1* | 12/2013 | Eldawy | G06F 16/9027 707/737 |
| 2014/0068075 | A1* | 3/2014 | Bonilla | H04L 41/0823 709/226 |
| 2014/0214834 | A1* | 7/2014 | Ozonat | G06F 16/9024 707/737 |
| 2014/0282402 | A1* | 9/2014 | Eksten | G06F 9/5072 717/123 |
| 2014/0359271 | A1 | 12/2014 | Gedik et al. | |
| 2015/0089514 | A1* | 3/2015 | Grewal | G06F 16/245 719/318 |
| 2015/0261886 | A1* | 9/2015 | Wu | G06F 16/9024 707/798 |
| 2016/0234070 | A1* | 8/2016 | Calo | H04L 41/12 |
| 2016/0378566 | A1* | 12/2016 | Barsness | G06F 9/5083 718/105 |
| 2017/0083380 | A1* | 3/2017 | Bishop | G06F 9/5083 |
| 2017/0235555 | A1* | 8/2017 | Cook | G06F 8/443 717/153 |
| 2017/0308456 | A1* | 10/2017 | Barsness | G06F 11/3612 |

OTHER PUBLICATIONS

John E. Kelly III, "Computing, cognition, and the future of knowing", IBM Corp. Oct. 2015, pp. 1-7.

Irina Botan et al., "Federated Stream Processing Support for Real-Time Business Intelligence Applications", International Workshop on Business Intelligence for the Real-Time Enterprise, Aug. 2009, pp. 1-18, Springer Berlin Heidelberg.

Valeria Cardellini, et al. "Optimal operator placement for distributed stream processing applications." Proc. 10th ACM International Conference on Distributed and Event-based Systems, Jun. 2016, pp. 69-80.

Rohit Khandekar, et al., "COLA: Optimizing stream processing applications via graph partitioning." in ACM/IFIP/USENIX International Conference on Distributed Systems Platforms and Open Distributed Processing, Nov. 2009, pp. 308-327, Springer Berlin Heidelberg.

Michael Duller, et al., "Virtualizing stream processing". In ACM/IFIP/USENIX International Conference on Distributed Systems Platforms and Open Distributed Processing, Dec. 2011, pp. 269-288, Springer Berlin Heidelberg.

Bin Cheng, et al., "GeeLytics: Geo-distributed edge analytics for large scale IoT systems based on dynamic topology", In 2015 IEEE 2nd World Forum on Internet of Things (WF-IoT), Dec. 2015, pp. 565-570, IEEE.

Peter Pietzuch, et al., "Network-aware operator placement for stream-processing systems". In Proc. 22nd International Conference on Data Engineering, 2006. ICDE'06, Apr. 2006, pp. 49-60, IEEE.

Qifan Pu, et al. "Low latency geo-distributed data analytics", SIGCOMM '15, Aug. 2015, pp. 421-434, ACM.

Joel Wolf, et al., "SODA: An optimizing scheduler for large-scale stream-based distributed computer systems." Middleware '08 Proceedings of the 9th ACM/IFIP/USENIX International Conference on Middleware, Dec. 2008, pp. 306-325, Springer Berlin Heidelberg.

Catherine H Crawford et al., unpublished U.S. Appl. No. 15/859,565, filed Dec. 31, 2017, Dynamic Graph Adaptation for Stream Processing Over Hybrid, Physically Disparate Analytics Platforms, pp. 1-29 plus 7 sheets of drawings.

Paul J. Otterstedt, List of IBM Patents or Patent Applications Treated as Related, Jun. 28, 2018, pp. 1-2.

* cited by examiner

DYNAMIC GRAPH ADAPTATION FOR STREAM PROCESSING OVER HYBRID, PHYSICALLY DISPARATE ANALYTICS PLATFORMS

BACKGROUND

The present invention relates to the electrical, electronic and computer arts, and more specifically, to cloud-integrated streaming analytics.

Many industries—including mining, manufacturing and healthcare—can benefit from Internet of Things (IoT) data and other streaming, machine-data analytics environments for real-time demand forecasting, preventive maintenance and closed-loop operational efficiencies and remediation.

Within these environments analytics can be produced by distributed stream processing systems (DSPS) or distributed data streams management systems (DSMS). In DSPS/DSMS, typically, one or more input data streams are manipulated through a directed graph of transformations to answer a continuous query. Stream processing runtimes can be used (i) to facilitate the description and development of an application graph describing an executing application and (ii) to support the execution of the application on a physical cluster of tightly coupled computing nodes (e.g., multiple cores of a fat server, or nodes of a datacenter connected via a high speed network).

SUMMARY

One or more embodiments of the present invention provide techniques for dynamic graph adaptation for stream processing over hybrid, physically disparate analytics platforms. In one or more aspects of the present invention, an exemplary computer-implemented method includes obtaining a streaming application graph, generating a partitioned graph by partitioning the streaming application graph in response to a topology descriptor and a partitioning algorithm, compiling the partitioned graph into a plurality of subgraphs for deployment to a plurality of respective runtimes that are described by the topology descriptor, and deploying the plurality of subgraphs to the plurality of respective runtimes.

In at least one aspect of the present invention, a computer-readable medium embodies computer-executable instructions, which when executed by a computer cause the computer to facilitate the method discussed above.

In at least one aspect of the present invention, an apparatus includes a memory embodying computer executable instructions, and at least one processor, coupled to the memory, and operative by the computer executable instructions to facilitate a method for dynamic graph adaptation for stream processing over hybrid, physically disparate analytics platforms.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

These and other features and advantages of the present invention will become apparent from the following detailed description of illustrative embodiments thereof, which is to be read in connection with the accompanying drawings.

DETAILED DESCRIPTION

Figure 1:
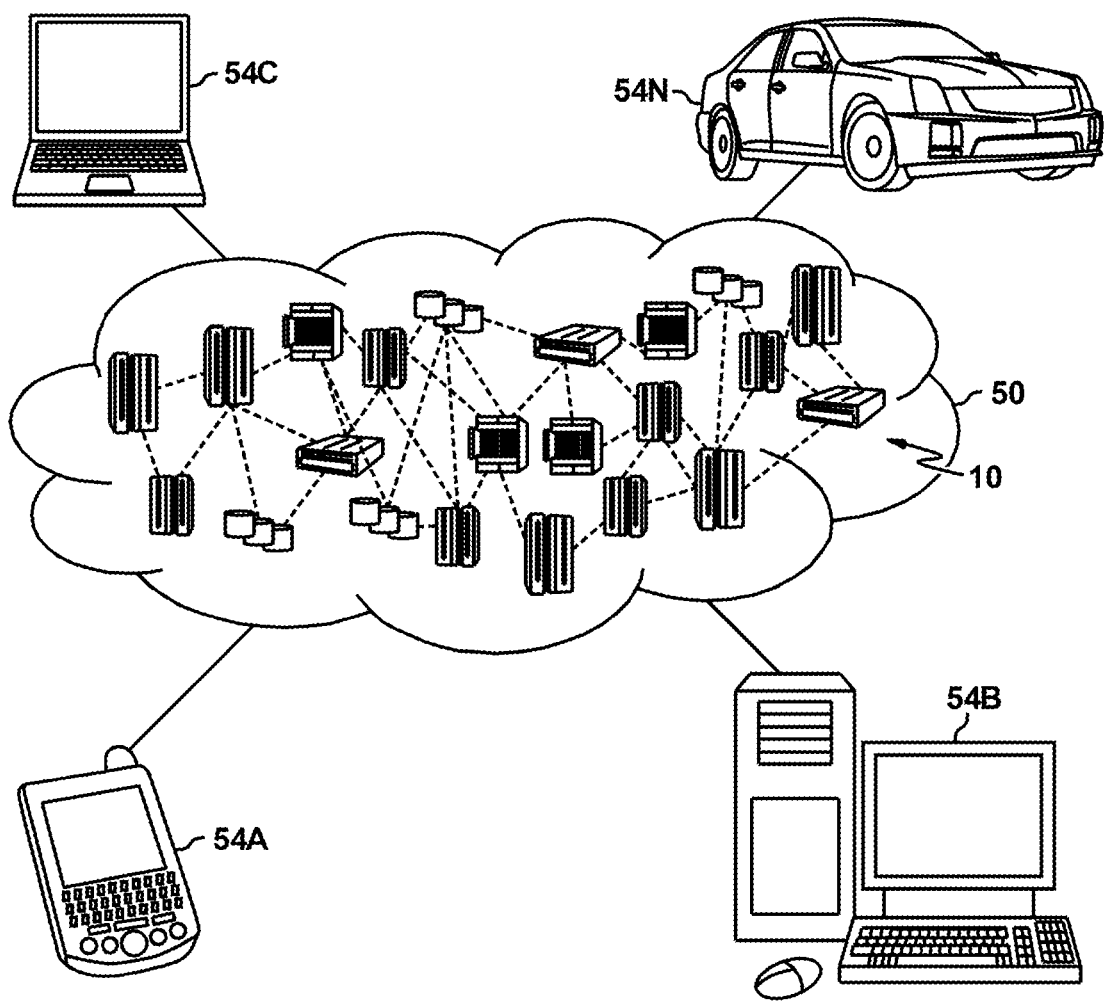
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
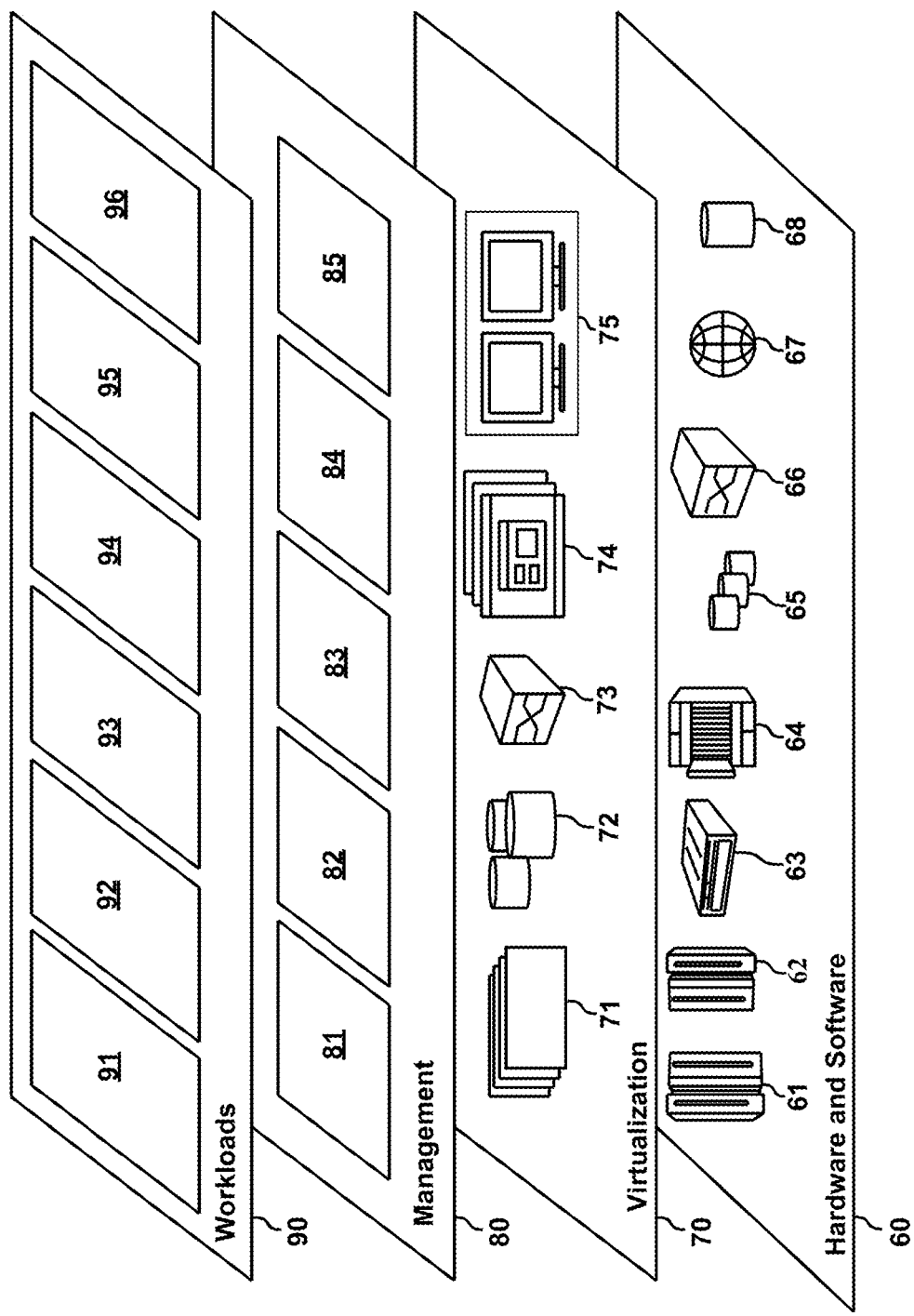
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a system 96 to partition stream processing applications across physically disparate and/or heterogeneous runtimes.

Stream processing applications are ubiquitous. Use-cases include, for example, IoT data, stock market analytics, and any type of transaction in general. For example, the advertising industry—and any e-commerce or other site that derives revenues from online ads—can benefit from cloud-based streaming analytics to aggregate ad data, monetize location-tagged customer data, extract social media insights and drive smarter digital campaigns. Likewise, the gaming and media industries can benefit from streaming analytics of user-generated data, web and social log data, and sentiment intelligence. In the automotive industry, connected cars are expected to rely on streaming cloud analytics for congestion management, real-time traffic updates and other critical intelligence and coordination. According to aspects of the invention, it is advantageous to split stream processing applications across physically separate infrastructures at the cloud edge for reasons such as satisfying inherent constraints, saving money, or improving performance (reduced latency). Additionally, according to aspects of the invention, it is advantageous to deploy stream processing across different runtimes within a traditional cloud. For instance, in hybrid private/public cloud environments, parts of a stream processing application might be offloaded to the public side for load-peak management, or parts might be kept strictly on the private side for confidentiality/export compliance reasons. Different infrastructures may run/support heterogeneous stream processing runtimes because of various reasons, for example: reduced hardware capabilities may mandate the use of lightweight stream processing runtimes with limited capabilities (e.g., system on a chip-based edge devices); closed infrastructures provide their own stream processing runtime and do not allow to have a homogeneous choice across the regions (e.g., public cloud PaaS, closed edge devices); data privacy and security constraints may require that data must only exist on specified hardware or may be operated on with specialized privacy aware or secure software. According to at least one aspect of the invention, two stream processing runtimes A and B are heterogeneous if one of the following applies: (1) The API used to program application for A is different from or incompatible with the API used to program applications for B; (2) The API used to control/manage the runtime A is different from the API used to control/manage the runtime B; or (3) The executable that runtime A runs are incompatible with the executable for runtime B.

For the reader's prompt understanding of this disclosure, certain definitions will be helpful:

(Data) Stream: logically unbounded sequence of data points, possibly timestamped.

Source and sink: respectively the abstractions of the origin of a data stream or its destination. For example, a source could correspond to a sensor or to a network source and a sink to a database or an outbound network endpoint.

Operator: arbitrarily complex computational component taking as input one or more streams, performing some computation on its input and producing one or more (possibly different) data streams as output.

(Stream processing) Application: Directed graph whose nodes are sources, operators or sinks, and describing the set of logical manipulation actions to perform on data streams to satisfy the business goals of the application. Directed edges connecting nodes in the graph represent streams of data that logically flow from one node to the next.

(Deployment) Region: Well defined set of tightly coupled computing nodes (e.g., a cluster in a datacenter or a set of edge/IoT devices within close geographical proximity).

IoT: The Internet of Things, e.g., sensor- and processor-equipped appliances, manufacturing machines, automobiles, etc. that are connected with the global Internet.

(Stream processing) Runtime: Software system providing an API and runtime support to ingest and run a stream processing application within a single region. Most of the available Data Stream Processing Systems available today fall into this definition of Stream processing runtime.

Figure 3:
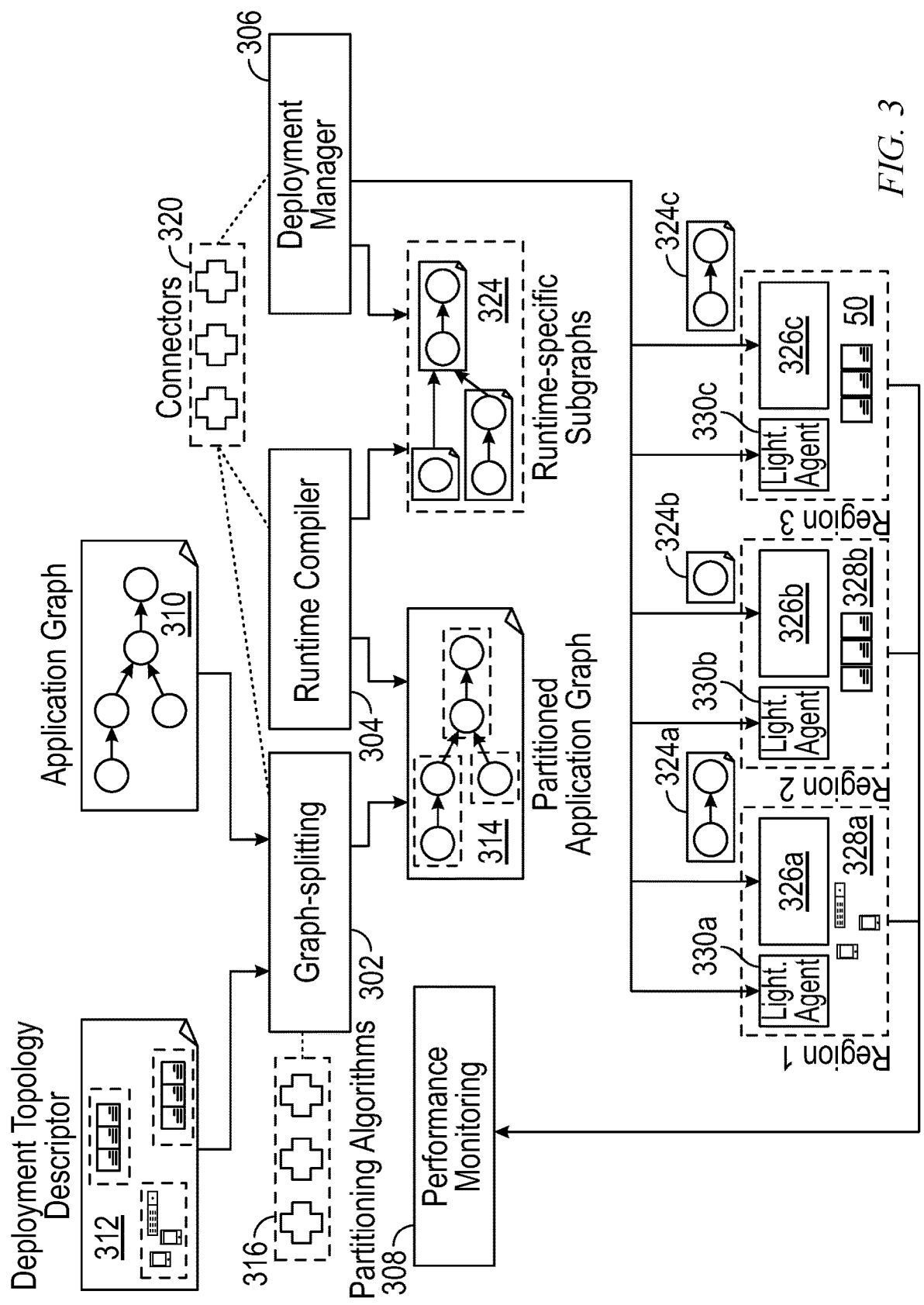
FIG. 3 depicts a modular architecture of a system to partition stream processing applications, according to an exemplary embodiment.

Referring to FIG. 3, an exemplary embodiment of the inventive system 96 includes a graph-splitting module 302, a runtime compiler 304, a deployment manager 306, and a performance monitoring module 308. Generally, the system 96 is an extensible and connector-based system that takes care of translating nodes of an application graph 310 into operators/sources/sinks specific to target runtimes 326*a-c*—also taking care to instrument those resultant subgraphs 324*a-c* with sink/sources able to provide data flow continuity across the target runtimes. One or more embodiments of the system 96 materialize a stream processing application graph 310 over the set of stream processing runtimes 326*a-c*, whereby each runtime of this set is running on a distinct information technology ("IT") infrastructure that is physically separated (own deployment region) from the IT infrastructure where the rest of the runtimes in the same set are running. In one or more embodiments, the inventive system 96 ingests the logical streaming application graph 310 as input and materializes, deploys, and synchronizes the streaming application across two or more, potentially physically disparate stream analytics engines or "runtimes" 326*a-c*. For the purpose of this disclosure, two regions which are "physically disparate" are not connected into a same Local Area Network (LAN) but only are connected through some sort of Wide Area Network (WAN). Physical separation's main technical challenges are related to connectivity. Links across a WAN between disparate regions might be slower and much more expensive (per transferred byte) by comparisons to links across a LAN within a region. Hence the challenge of carefully choosing where to split an application graph, in order to minimize inter-region data transfer while still satisfying other constraints. Other challenges relate to the reliability of the links between regions. Particularly, WAN connectivity might be intermittent so that the system must be able to deal with temporary offline operations. Additionally, the system 96 orchestrates execution of the streaming application graph 310 across numerous runtimes 326*a-c* and regions 328*a-c*, providing gluing communication channels to carry data among the regions 328*a-c*.

"Communication channels" mean any logical communication abstraction connecting components on the cloud and on the deployment regions. On a logical level, communication channels can be, e.g., a message passing interface, a TCP socket, or an application-specific protocol. Communication channels may be mapped onto different "physical" channels, e.g., phone lines, cellular data links, microwave data links, wired Ethernet cables, or optical data transmission systems. Each type of channel has its own performance characteristics and its associated cost. One challenge is that, frequently, one cannot choose the type of link that is in place between regions; consider a remote physical region that might be covered only via (possibly poor) cellular network.

The system 96 also coordinates dynamic changes of runtime topology and ensures correct execution upon the altered runtime topology. In response to topology changes, some component that was executing in an edge region might need to be executed on the cloud. While executing the change one or more embodiments guarantee that no data "in transit" is lost. In this type of embodiment, the component on the region is not halted while starting the one on the cloud. Instead, such embodiments synchronize the process, opening more than one logical channel between the region and the cloud to make sure that no "in-transit" data is lost but also that no data is processed twice. Thus, one or more embodiments of the system 96 advantageously provide an ability to map the whole or parts of the application graph 310 on processing subgraphs 324a-c that can be run on specifically supported runtimes 326a-c. Additionally, by providing a common graph description language that is independent on the runtime used, the system 96 also hides semantic differences between similar operations across disparate runtimes.

The graph-splitting module 302 takes care of finding (sub-)optimal partitions 322 of the application graph 310 across different regions. The graph-splitting module 302 obtains the application graph 310 and a deployment topology descriptor 312, and generates a partitioned application graph 314. The graph-splitting module 302 generates the partitioned application graph 314 in response to the topology descriptor 312, the logical application graph 310, and partitioning algorithms and cost models 316, also taking into account different semantics and capabilities of different runtimes instantiated in various network regions. In one or more embodiments, the graph-splitting module 302 makes use of partitioning algorithms 316 such as SODA (Scheduling Optimizer for Distributed Applications) or COLA or SBON (Stream-based Overlay Network). However, in other embodiments the graph-splitting module 302 permits plugging user-defined splitting functions and cost models in order to satisfy emerging business needs and constraints, leveraging the information available in the system. For example, one or more embodiments provide a way to let users plug-in their own code and use it (a few examples: OSGI-based extension, or dynamic load of java/python functions). They could also support simplified domain-specific languages, especially to express their constraints and cost models. In one or more embodiments, the graph-splitting module 302 responds to several objectives and constraints, including:

Data rates at the sources
Models of the operator semantics
Knowledge of the topology characteristics
Runtime abilities (certain node operators not present on some runtimes)
Knowledge of the runtime state of the regions (see "Monitoring" later)
Cost model of resources (e.g., public cloud and network costs)
Semantics of different runtimes
Data security and privacy including geographical/regional regulations.

In one or more embodiments, the application graph 310 is automatically constructed from a document written in a declarative language (e.g., SPL or Streams Processing Language) or from an operational program (e.g., Apache Edgent). In both cases, the description can be transformed into the application graph 310 of source/operator/sink nodes and streaming edges. In one or more embodiments, the application graph 310 includes several types of sources/operators/sinks that are sufficiently generic to represent at least the greatest common denominator of the most common streaming operations (e.g., filter, map, window-based aggregations). For example, the application graph 310 includes two source nodes, one sink node, and two operator nodes. In certain embodiments, the application graph 310 declares the use of streaming toolkits (e.g. Speech2Text in IBM Streams), which pose extra deployment constraints and/or prune the splitting search space, subject to runtimes requirements across regions. Advantageously, one or more embodiments do not require that the application graph 310 needs to contain any hint about how the graph should be deployed on the available regions and runtimes. In one or more embodiments, the application graph 310 contains information about the expected data rates at the graph sources or other information that is useful as input to cost models and/or partitioning algorithms.

In one or more exemplary embodiments, the topology descriptor 312 is a document that lists the available regions, their computational capabilities and constraints, and—for each region 328a-c—the stream processing runtime 326a-c that it supports, which will be one of the connectors 320 that are known by the system. Each of the connectors 320 is a program implementing a specific binary interface, which is able to translate any source/operator/sink node in the application graph 310 into one or more source/operator/sink nodes in a format which is understood by the target runtime 326a-c. In one or more embodiments, each connector 320 is able to hide semantic differences between the logical operators and their "physical" mapping. In certain embodiments, the topology descriptor 312 also describes the physical location of data sources (e.g., sensors at the edge), and the connectivity options between the different regions 328a-c. In other embodiments, the topology descriptor 312 declares sensor types within sets of geographical bounding boxes; pinning operators to specific sensors is handled later in the deployment workflow. In one or more embodiments, details about how a single runtime manages the resources available in the region (in case of a distributed runtime) are transparent to the system.

The runtime compiler 304 receives the partitioned application graph 314 from the graph-splitting module 302. Using mappings defined by the available (default or user provided) runtime connectors 320, the runtime compiler 304 compiles—for each partition 322 of the partitioned application graph 314—a runtime-specific subgraph 324a-c that corresponds to an executable stream processing application that can run on one of the different target runtimes 326a-c available in the deployment regions 328a-c. More particularly, the compiler 304 traverses the partitioned application graph 314 and produces the runtime-specific subgraphs 324a-c. The partitioned application graph 314 is neutral to specific stream processing run-time. The compiler goes over the portions of the partitioned application graph 314 one by one and it translates each partition 322 into a subgraph 324a-c that is understandable and executable by the stream processing runtime 326a-c that is supposed to execute that partition.

The compile operation of the runtime compiler 304 is based on the paradigm of the connectors 320. The connectors 320 are user or vendor provided libraries that specify how components in the partitioned application graph 314 should be translated into runtime components that are specific to a particular stream processing system. For example, a connector for Quarks, would translate a generic "filter" operator into a Quarks-specific Java operator that uses the Quarks Java API to implement filtering operations. Moreover, each connector 320 enables the runtime compiler 304 to define and create communication channels between runtimes 326a-c, where the communication channels correspond to graph split points. In one or more embodiments, each runtime 326a-c will have its own data representation and communication protocol that is not compatible with all of the other runtimes. Thus, a connector 320 for each runtime 326a-c would provide the software "adaptor" that is able to translate data being produced at a split-point, and send the data through a communication channel via a standard communication protocol. On the receiving end, the connector 320 of another runtime 326a-c should be able to receive and understand the data in the standard communication protocol and translate the data to be fed into the receiving end of the split-point. In one or more embodiments, by looking at the global application graph 310, the runtime compiler 304 introduces ad-hoc network sources or sinks into the physical subgraphs 324a-c in order to facilitate communication between runtimes 326a-c in different regions (e.g., MQTT ("Message Queue Telemetry Transport"), or HTTP ("Hypertext Transfer Protocol") data sources and sinks).

The deployment manager 306 is able to talk to the different runtimes 326a-c that run in the regions 328a-c, through a connector system similar to the one used by the compiler. As mentioned previously, the connectors 320 are libraries plus metadata that not only specify how to translate generic partitions 322 into runtime-specific sub-graphs 324a-c, but also contain the functions that allow to drive (e.g., start, stop, or deploy some graph) the actual runtimes 326a-c living in the deployment regions 328a-c. The deployment manager 306 deploys the application subgraphs 324a-c to the runtimes 326a-c on the available regions 328a-c, sets up the communication channels that interconnect the regions 328a-c, and orchestrates the execution of the overall application. The deployment manager 306 also takes part in the coordination of dynamic graph changes. More particularly, the deployment manager 306 (using the functionalities in the connectors 320) communicates with the runtimes 326a-c and the sub-graphs 324a-c at the deployment regions 328a-c. The communication protocols can be runtime-specific and implemented by the connectors 320. The deployment manager 306 manages the logic of these interactions and ensures they happen at the same time and in the correct order.

Each of the deployment regions 328a-c runs one of the stream processing runtimes 326a-c and accepts commands from the deployment manager 306 to deploy one or more of the subgraphs 324a-c to the appropriate runtime 326a-c. In one or more embodiments, one or more of the deployment regions 328a-c also run a lightweight agent 330a-c to support advanced features like synchronization of dynamic graph changes. In case these advanced features are needed, for example, to guarantee no data loss when switching runtimes from a region to the cloud, the lightweight agent 330a-c has a communication channel listening for commands from the deployment manager 306. These commands instruct the lightweight agent 330a-c about new graph parts to deploy and execute, about the possible instantiation of parallel communication channels to avoid data loss during transition phases, and about tearing down communication channels when a transition is complete. In one or more embodiments, the lightweight agent 330a-c also gathers performance statistics and sends the statistics to the monitoring module 308.

The performance monitoring module 308 collects monitoring parameters from the deployment regions 328a-c in fixed or variable size epochs. In one or more embodiments, the monitoring parameters include at least one of:

Measured incoming data rates at operator inputs.
Queue lengths, average processing latency.
Resources used by single operators (e.g., CPU time per tuple, memory per operator) or globally by the runtime.
Availability of consumable resources, e.g., battery or data transfer limits for edge devices.

The performance monitoring module 308 modifies the partitioning algorithms 316 in response to the monitoring results, and the graph-splitting module 302 then finds new graph partitions 314 in response to the updated partitioning algorithms 316. Thus, the performance monitoring module 308 feeds back to the compiler 304 and the deployment manager 306, via the graph-splitting module 302, to instruct dynamic movement of stream processing operators across different runtimes 326a-c.

Figure 4:
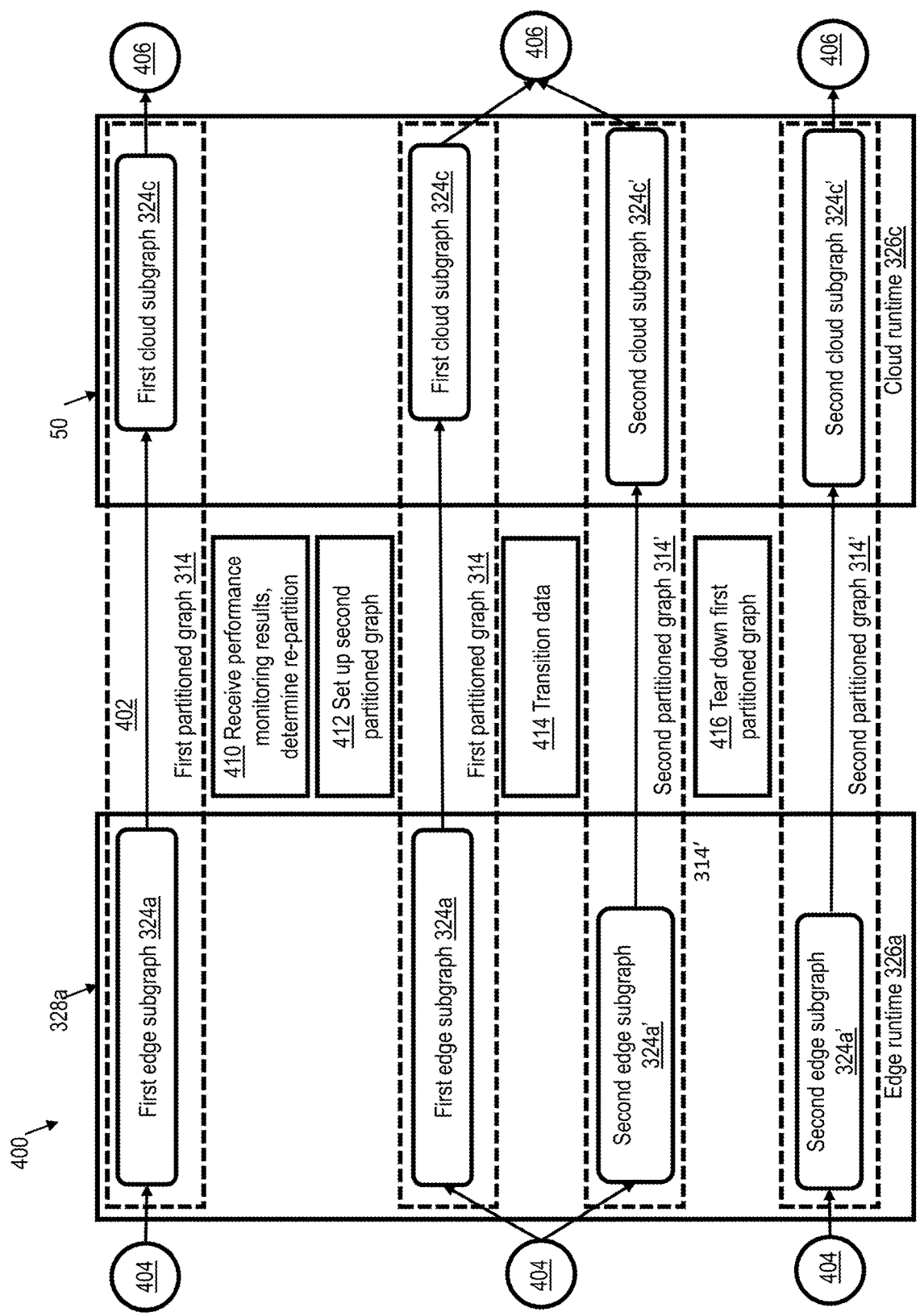
FIG. 4 depicts operation of a dynamic optimizer in the system of FIG. 3, according to an exemplary embodiment.

FIG. 4 shows, as an example, how the system 96 implements a dynamic optimizer method 400 for reconfiguration of the split-point in a first partitioned graph 314. Step 402 is the initial condition, with a fixed data source 404 in an edge region 328a and with a fixed data sink 406 in the cloud computing environment 50. "Fixed" means only that the source and sink are not subject to the reconfiguration that is illustrated in FIG. 4. At step 402, the first partitioned graph 314 that connects the fixed data source 404 with the fixed data sink 406 already has been partitioned into a first edge subgraph 324a and into a first cloud subgraph 324c. The first edge subgraph 324a runs in an edge runtime 326a in the edge region 328a. The first cloud subgraph 324c runs in a cloud runtime 326c in the cloud computing environment 50. The union of subgraphs 324a, 324c composes the first partitioned graph 314, which needs to be repartitioned between edge region 328a and cloud computing environment 50. At step 410, the graph-splitting module 302 receives performance monitoring results from the performance monitoring module 308, and determines that the first partitioned graph 314 should be re-partitioned. Accordingly, at step 412 the deployment manager 306 sets up a second partitioned graph 314' in parallel to the first partitioned graph 314. The second partitioned graph 314' includes a second edge subgraph 324a' and a second cloud subgraph 324c'. The second cloud subgraph 324c' includes one or more operators that previously were part of the first edge subgraph 324a. At step 414 the deployment manager 306 transitions data from the first partitioned graph 314 to the second partitioned graph 314'. At step 416 the deployment manager 306 tears down the first partitioned graph 314.

Figure 5:
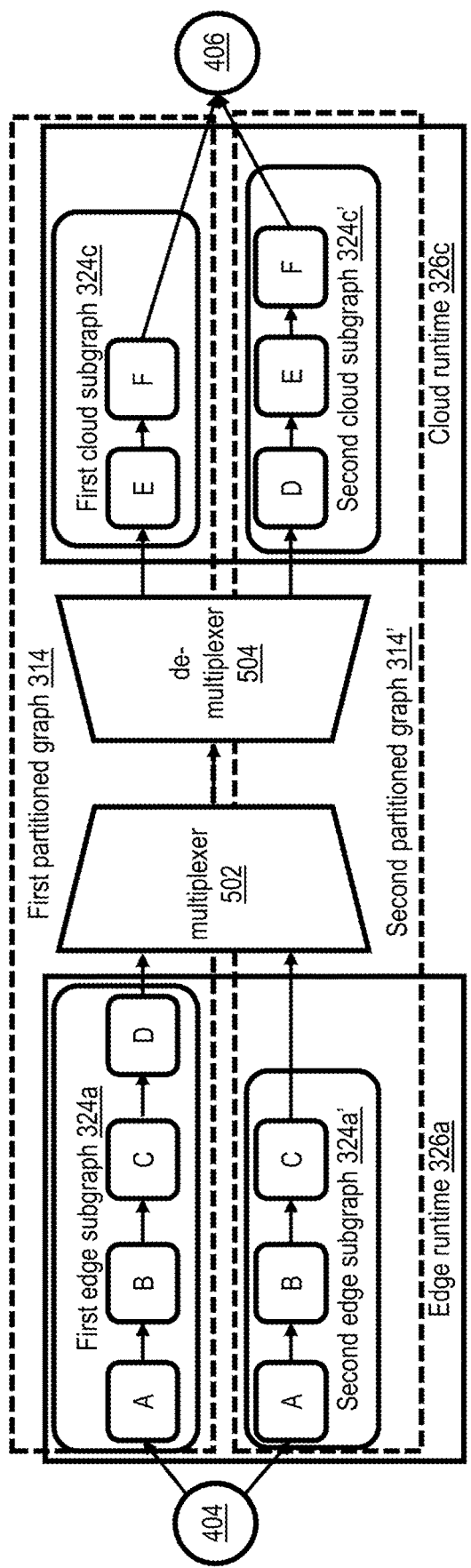
FIG. 5 depicts operation of a dynamic optimizer in the system of FIG. 3, according to an exemplary embodiment.

According to at least one aspect of the invention, FIG. 5 depicts an implementation of the dynamic optimizer method 400, in which the first partitioned graph 314 and the second partitioned graph 314' share a single communication channel, so that packets of the data flowing through the communication channel need to be multiplexed by a multiplexer 502 that is located in the region 328a and need to be demultiplexed by a demultiplexer 504 that is located in the cloud computing environment 50. The first partitioned graph 314 has operators "A", "B", "C", and "D" executing on the edge runtime 326a in the first edge subgraph 324a, and has operators "E" and "F" executing on the cloud runtime 326c in the first cloud subgraph 324a. The second partitioned graph 314' has operators "A", "B", and "C" executing on the edge runtime 326a in the second edge subgraph 324a', and has operators "D", "E", and "F" executing on the cloud runtime 326c in the second cloud subgraph 324c'.

Figure 6:
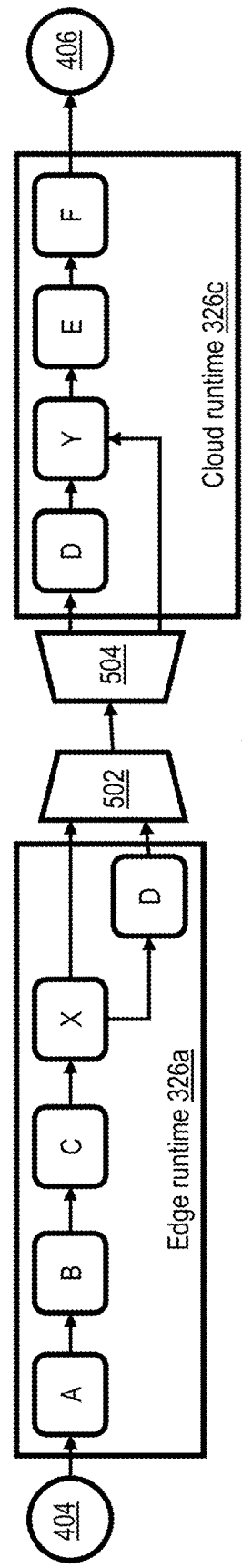
FIG. 6 depicts operation of a dynamic optimizer in the system of FIG. 3, according to an exemplary embodiment.

According to at least one aspect of the invention, FIG. 6 depicts how the implementation of FIG. 5 could switch from the first partitioned graph 314 to the second partitioned graph 314', without instantiating an entire set of new operators. In this case, the two partitioned graphs 314, 314' are exactly the same except for operator "D", which in the first partitioned graph 314 runs on the edge runtime 326a whereas in the second partitioned graph 314' operator "D" runs on the cloud runtime 326c. The implementation of FIG. 6 can reuse "A", "B", and "C" operators by inserting a special operator ("X"—a switch) between "C" and "D" in the edge runtime 326a and inserting another special operator ("Y"—a second switch) between "D" and "E" in the cloud runtime 326c. "X" routes messages either to a first instance of "D" in the edge runtime 326a (and—via "D"—through the multiplexer 502 and the demultiplexer 504 to the second switch Y) or directly to the multiplexer 502, and through the multiplexer 502 and the demultiplexer 504 to a second instance of "D" in the cloud runtime 326c, depending on the reconfiguration instructions from the deployment manager 306. Thus, only the second instance of the operator "D" and the switches "X" and "Y" need to be instantiated in addition to the original instances of the operators for the first partitioned graph 314. For larger graphs, the efficiency of reduced instantiation becomes more apparent.

Figure 7:
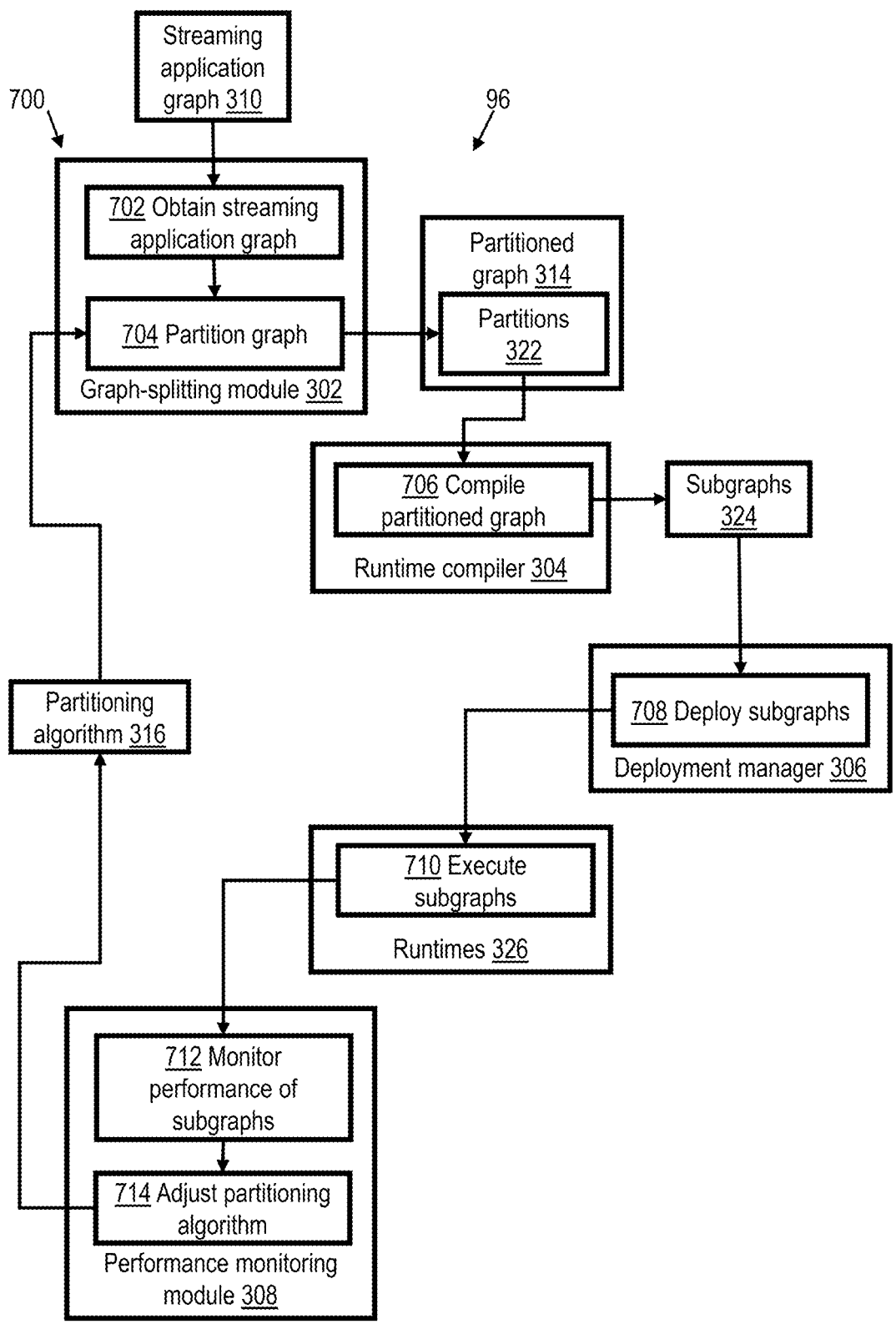
FIG. 7 depicts a method implemented by the system of FIG. 3.

FIG. 7 depicts in a flowchart a method 700 that is implemented by the components of the system 96. At step 702, the graph-splitting module 302 obtains the streaming application graph 310. At step 704, the graph-splitting module 302 partitions the streaming application graph 310, in response to the topology descriptor 312 and the partitioning algorithm 316, to produce the partitioned graph 314. At step 706, the runtime compiler 304 compiles the partitioned graph 314 into the plurality of subgraphs 324a-c for deployment to the plurality of respective runtimes 326a-c that are described by the topology descriptor 312. For example, the runtime compiler 302 uses the connectors 320 to translate the partitions 322 of the partitioned graph 314 for execution on their respective runtimes 326a-c. At step 708, the deployment manager 306 deploys the plurality of subgraphs 324a-c to the plurality of respective runtimes 326a-c. At step 710, each of the runtimes 326a-c executes its respective subgraph 324a-c within its respective region 328a-c. According to certain exemplary embodiments, one or more of the regions 328a-c are implemented in the cloud computing environment 50. At step 712, the performance monitoring module 308 monitors performance of the plurality of subgraphs 324a-c on the plurality of runtimes 326a-c. At step 714, the performance monitoring module 308 adjusts the partitioning algorithm 316 in response to the monitored performance of the plurality of subgraphs 324a-c on the plurality of respective runtimes 326a-c. The graph-splitting module 302 then repeats step 704.

In view of the foregoing, techniques of the present invention can provide substantial beneficial technical effects. For example, one or more embodiments provide one or more of:

Ability to split a stream processing application graph across heterogeneous runtimes on separate physical regions based on user provided functions that reflect their business needs and constraints (including, e.g., a specific cost model).

Ability to map the whole or parts of the logical processing graph on processing graphs that can be run on specifically supported runtimes. By doing so, the system takes also care of hiding the semantic differences between similar operations across disparate runtimes.

Ability to add support to specific runtimes by having the user implement system provided interfaces.

Thus, one or more embodiments of the invention advantageously provide a solution to flexibly "glue" several heterogeneous runtimes for execution of a streaming application in parallel streams. This solution allows expression of business and technical constraints that dynamically drive the partition and distribution of the application across the runtimes. Additionally, the solution flexibly maps (parts of) generic stream processing applications to specific software runtimes, transparently managing the inherent differences of the operational semantics of the runtimes. The solution advantageously supports transparent execution of an application spanning across physically disparate and/or heterogeneous runtimes and regions, and is able to dynamically reconfigure the deployment of the application according to emerging constraints or business requirements.

In view of the foregoing, it will be appreciated that techniques of the present invention can provide substantial beneficial technical effects. For example, one or more embodiments provide one or more of:

Applications are written in one generic programming language and can be executed on any previously incompatible runtime (provided there is a connector).

Applications written in generic programming language can be transparently executed across several regions, without any explicit intervention from the programmer.

Dynamic repartitioning allows to improve performance or reduce cost based on external input, automatically without need of any technical knowledge or intervention from the programmer side.

Given the discussion thus far, and with reference to the drawing Figures, it will be appreciated that, in general terms, a system 96 implements an exemplary computer-implemented method 700, according to an aspect of the invention, which includes step 702 of obtaining a streaming application graph 310. The method 700 also includes step 704 of partitioning the streaming application graph 310 in response to the topology descriptor 312 and the partitioning algorithm 316. At step 706, the system 96 compiles the partitioned graph 314 into a plurality of subgraphs 324a-c for deployment to a plurality of respective runtimes 326a-c that are described by the topology descriptor 312. For example, the system 96 uses the connectors 320 to translate the partitions 322 of the partitioned graph 314 for execution on their respective runtimes 326a-c. At step 708, the system 96 deploys the plurality of subgraphs to the plurality of respective runtimes. In one or more embodiments, at step 710, each of the runtimes 326a-c executes its respective subgraph 324a-c. According to certain exemplary embodiments, one or more of the runtimes 326a-c are implemented in the cloud computing environment 50. In one or more embodiments, at step 712, the system 96 monitors performance of the plurality of subgraphs 324a-c on the plurality of runtimes 326a-c. In one or more embodiments, at step 714, the system 96 adjusts the partitioning algorithm 316 in response to the monitored performance of the plurality of subgraphs 324a-c on the plurality of respective runtimes 326a-c. The plurality of respective runtimes 326a-c may be physically disparate and/or heterogeneous.

Figure 8:
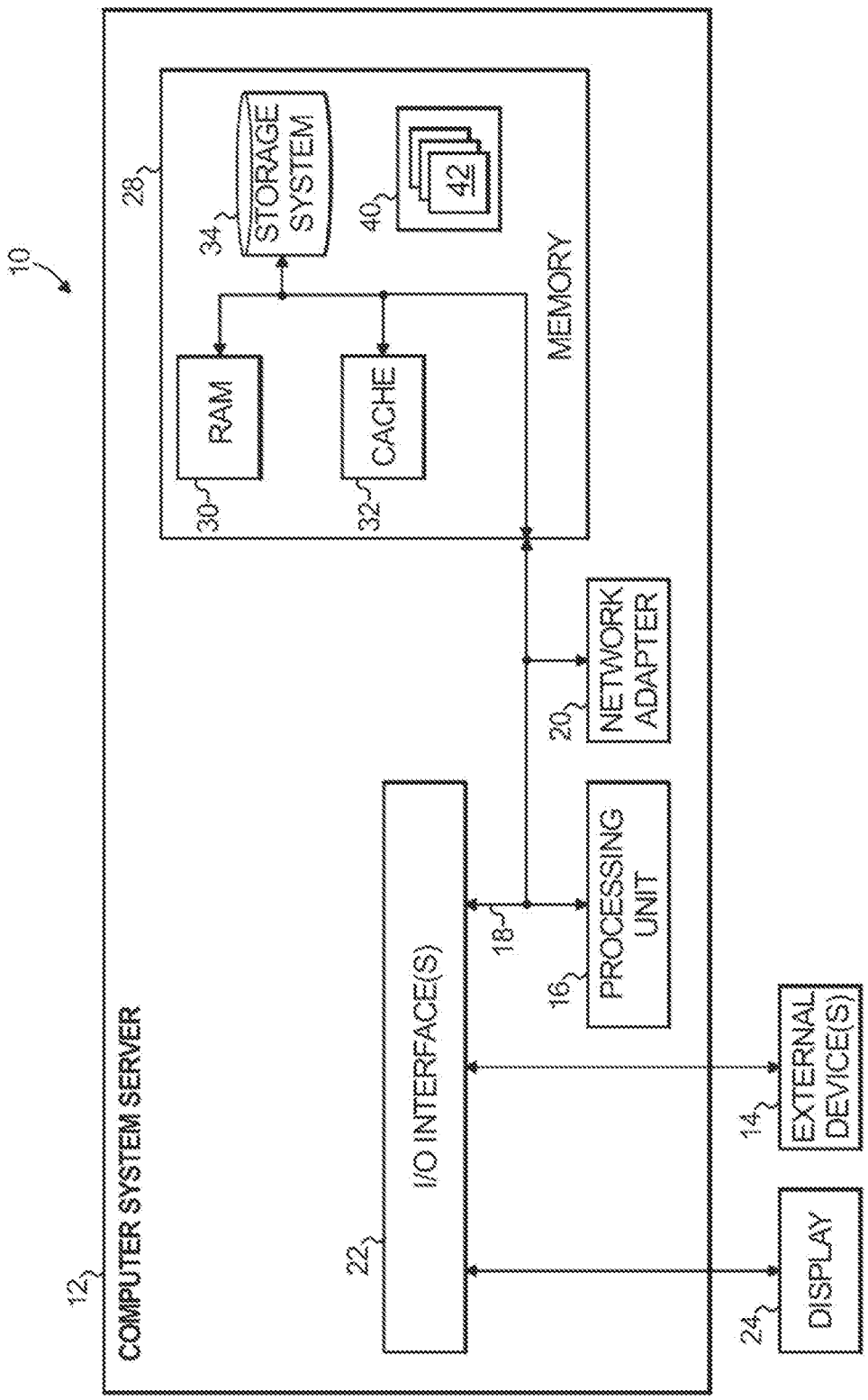
FIG. 8 depicts a computer system that may be useful in implementing one or more aspects and/or elements of the invention, also representative of a cloud computing node according to one or more embodiments of the present invention.

One or more embodiments of the invention, or elements thereof, can be implemented in the form of an apparatus including a memory or other computer-readable medium that embodies computer-executable instructions and at least one processor that is coupled to the memory or other computer-readable medium and operative by the computer-executable instructions to perform exemplary method steps. FIG. 8 depicts a computer system that may be useful in implementing one or more aspects and/or elements of the invention, also representative of a cloud computing node 10 according to an embodiment of the present invention. Referring now to FIG. 8, exemplary cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A non-transitory computer readable medium embodying computer executable instructions, which when executed by a computer cause the computer to facilitate:
    obtaining a streaming application graph;
    generating a first partitioned graph by partitioning the streaming application graph in response to a partitioning algorithm and a topology descriptor that describes at least the physical locations and connectivities of a plurality of respective runtimes;
    compiling the first partitioned graph into a first plurality of subgraphs for deployment to the plurality of respective runtimes that are described by the topology descriptor;
    deploying the first plurality of subgraphs to the plurality of respective runtimes;
    executing the first plurality of subgraphs on the plurality of respective runtimes;
    monitoring performance of the first plurality of subgraphs on the plurality of respective runtimes; and
    adjusting the partitioning algorithm in response to monitored performance of the first plurality of subgraphs on the plurality of respective runtimes.

2. The non-transitory computer readable medium of claim 1 further comprising:
    generating a second partitioned graph by partitioning the streaming application graph in response to the partitioning algorithm adjusted in response to the monitored performance and the topology descriptor;
    compiling the second partitioned graph into a second plurality of subgraphs;
    instantiating only portions of the second plurality of subgraphs, which match portions of the first plurality of subgraphs in function but not in runtime, in the plurality of respective runtimes;
    inserting a first special operator in a first of the plurality of respective runtimes that instantiates one of the first plurality of subgraphs that matches a respective one of the second plurality of subgraphs in function but not in runtime;
    forwarding communications from the first special operator to the respective one of the second plurality of subgraphs; and
    tearing down the one of the first plurality of subgraphs.

3. The non-transitory computer readable medium of claim 1 wherein the plurality of respective runtimes are implemented in a plurality of physically disparate deployment regions.

4. The non-transitory computer readable medium of claim 1 wherein the plurality of respective runtimes are heterogeneous.

5. The non-transitory computer readable medium of claim 1 wherein compiling the first partitioned graph is accomplished by using connectors to translate a plurality of partitions of the first partitioned graph to the first plurality of subgraphs for execution on the plurality of respective runtimes.

6. An apparatus comprising:
a memory embodying computer executable instructions; and
at least one processor, coupled to the memory, and operative by the computer executable instructions to facilitate:
obtaining a streaming application graph;
generating a first partitioned graph by partitioning the streaming application graph in response to a partitioning algorithm and a topology descriptor that describes at least the physical locations and connectivities of a plurality of respective runtimes;
compiling the first partitioned graph into a first plurality of subgraphs for deployment to the plurality of respective runtimes that are described by the topology descriptor;
deploying the first plurality of subgraphs to the plurality of respective runtimes;
executing the first plurality of subgraphs on the plurality of respective runtimes;
monitoring performance of the first plurality of subgraphs on the plurality of respective runtimes; and
adjusting the partitioning algorithm in response to monitored performance of the first plurality of sub graphs on the plurality of respective runtimes.

7. The apparatus of claim 6 further comprising:
generating a second partitioned graph by partitioning the streaming application graph in response to the partitioning algorithm adjusted in response to the monitored performance and the topology descriptor;
compiling the second partitioned graph into a second plurality of subgraphs;
instantiating only portions of the second plurality of subgraphs, which match portions of the first plurality of subgraphs in function but not in runtime, in the plurality of respective runtimes;
inserting a first special operator in a first of the plurality of respective runtimes that instantiates one of the first plurality of subgraphs that matches a respective one of the second plurality of subgraphs in function but not in runtime;
forwarding communications from the first special operator to the respective one of the second plurality of subgraphs; and
tearing down the one of the first plurality of subgraphs.

8. The apparatus of claim 6 wherein the plurality of respective runtimes are implemented in a plurality of physically disparate deployment regions.

9. The apparatus of claim 6 wherein the plurality of respective runtimes are heterogeneous.

* * * * *